May 14, 1935.                F. W. DOUTHITT                2,001,457
                           CORN CUTTING MACHINE
                    Filed April 8, 1931    5 Sheets-Sheet 3
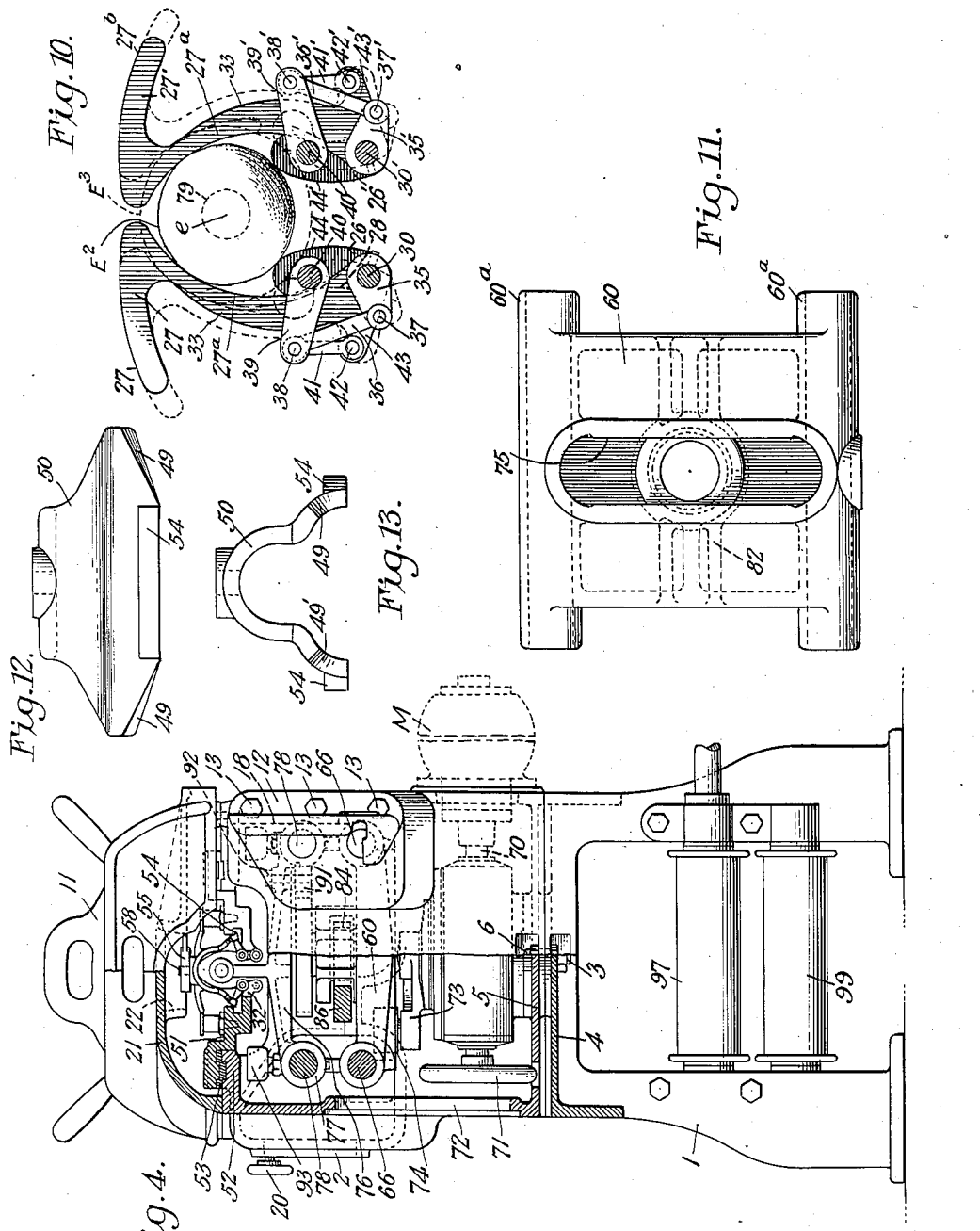
INVENTOR.
Frank W. Douthitt
BY
Sturtevant Mason & Porter
ATTORNEYS

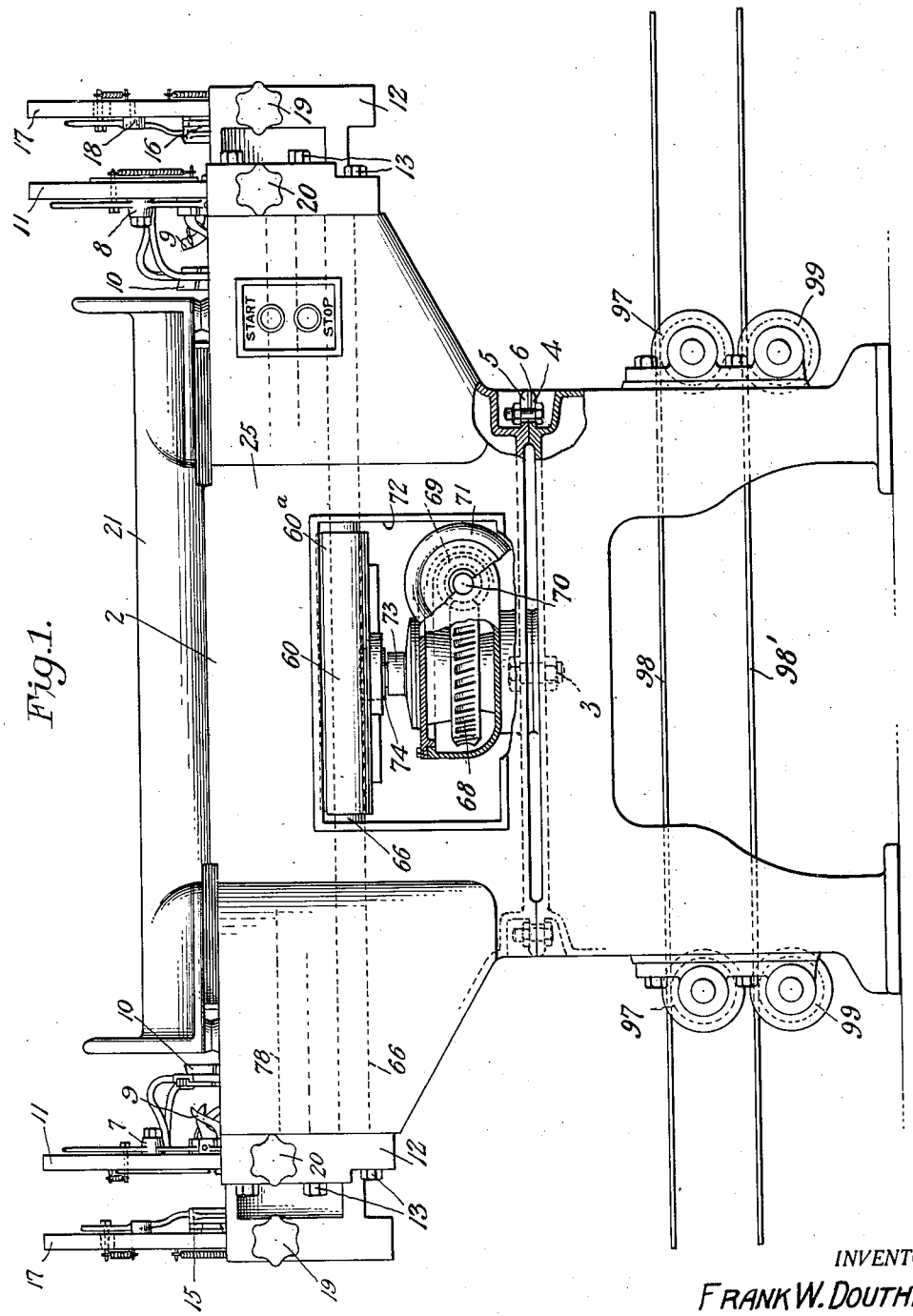

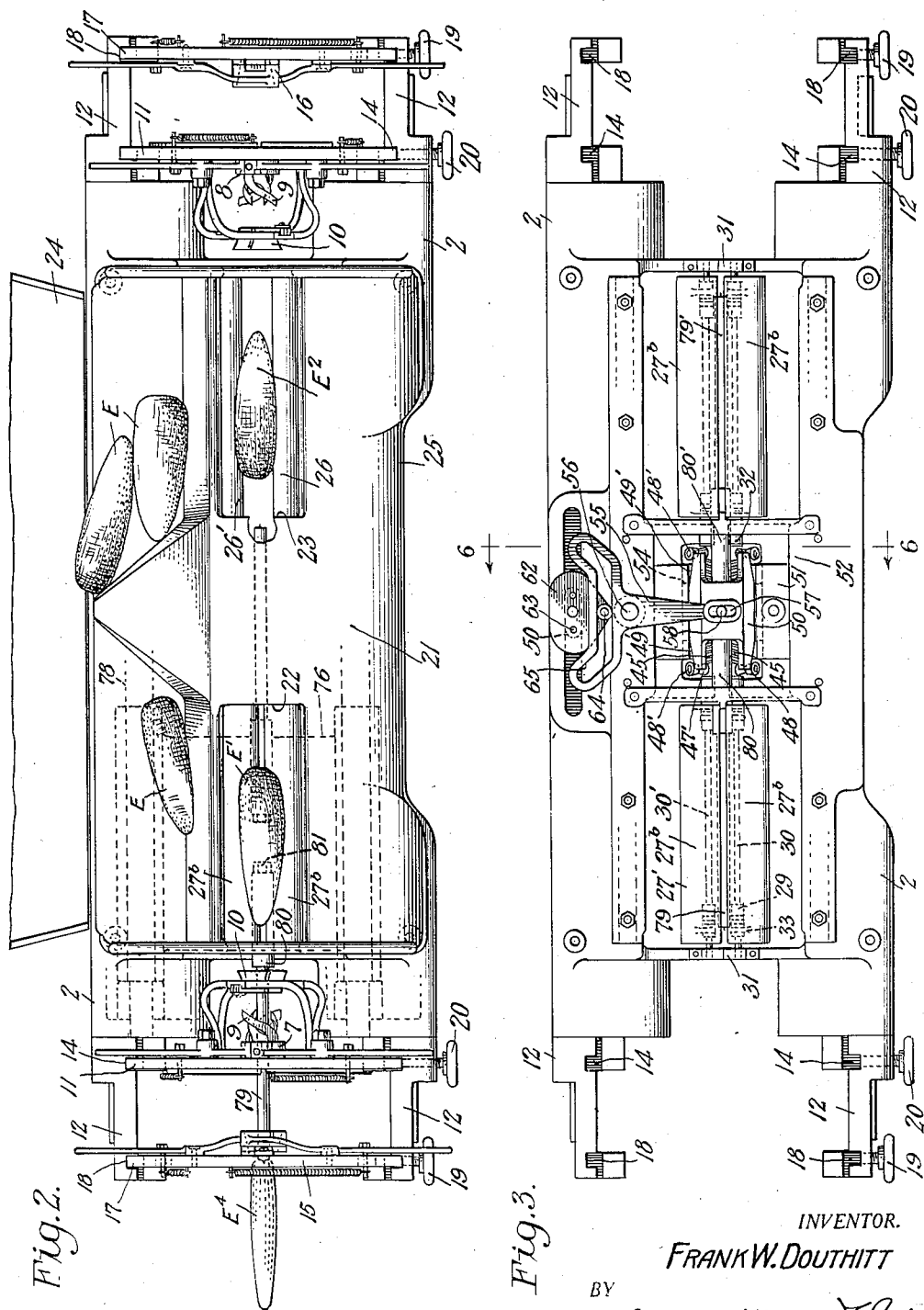

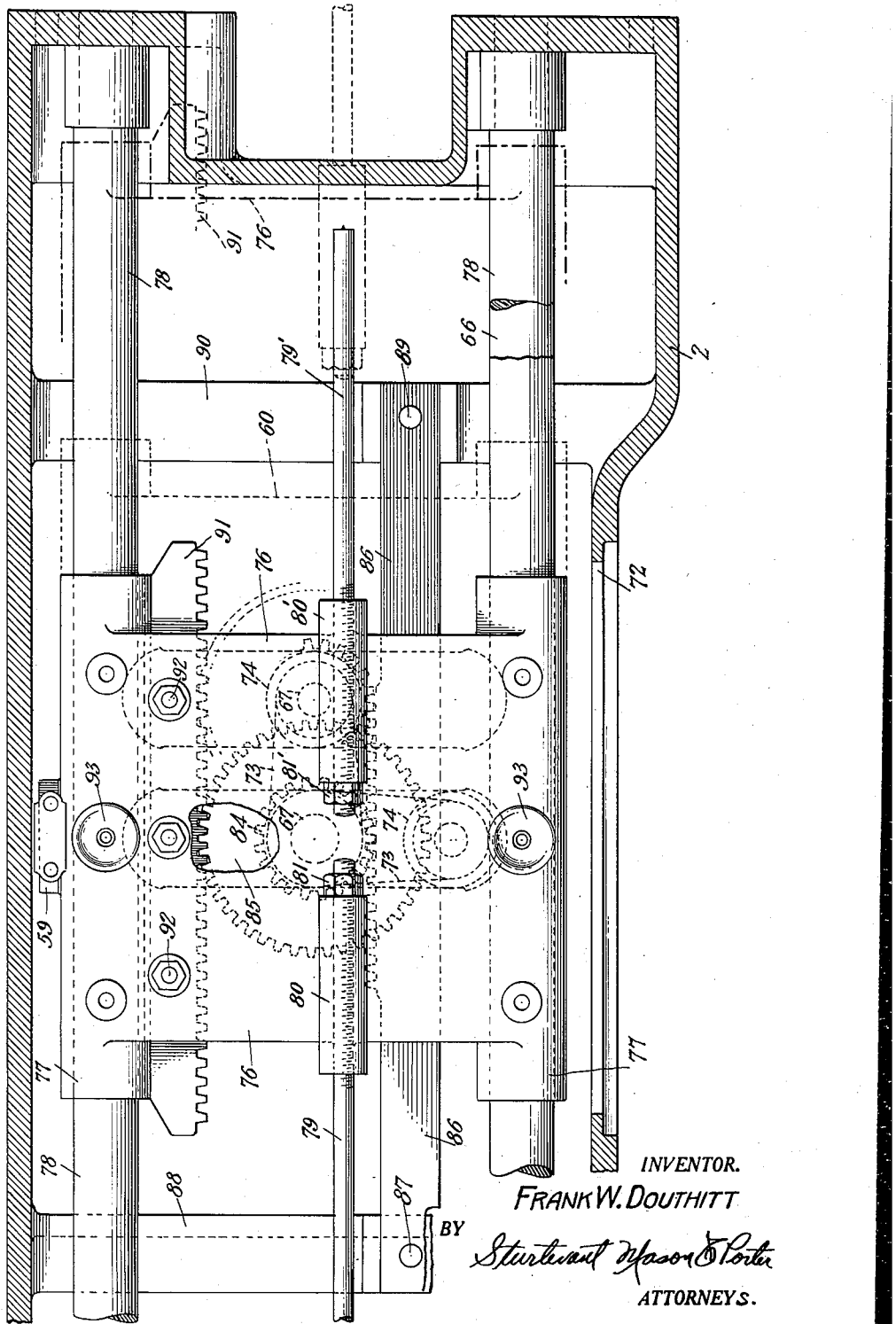

May 14, 1935.  F. W. DOUTHITT  2,001,457
CORN CUTTING MACHINE
Filed April 8, 1931   5 Sheets-Sheet 5
Fig.6.
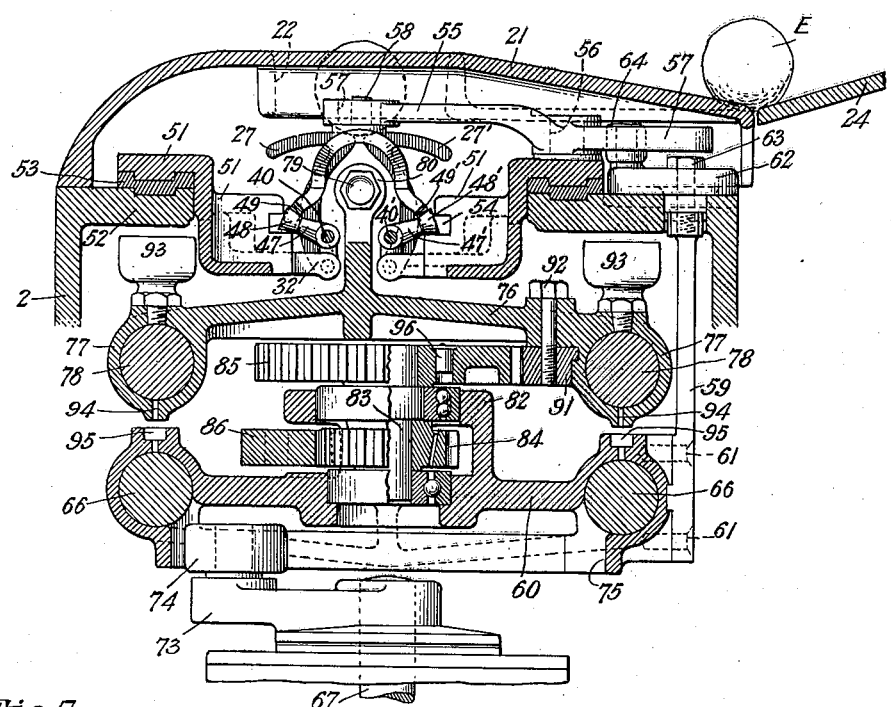
Fig.7.
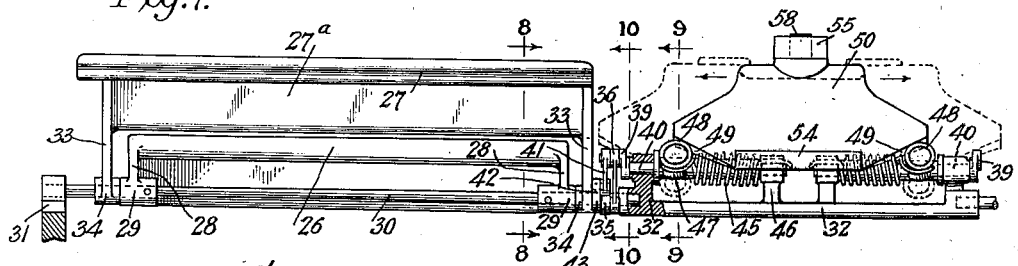
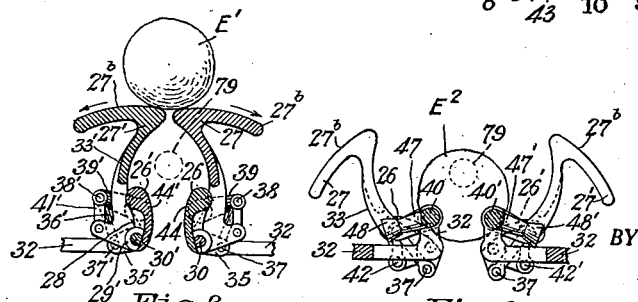
Fig.8.   Fig.9.
INVENTOR.
FRANK W. DOUTHITT
BY
Sturtevant Mason & Porter
ATTORNEYS.

Patented May 14, 1935

2,001,457

UNITED STATES PATENT OFFICE 2,001,457

CORN CUTTING MACHINE

Frank W. Douthitt, Ortonville, Minn.

Application April 8, 1931, Serial No. 528,690

17 Claims. (Cl. 130—9)

The invention relates to new and useful improvements in a machine for cutting green corn, and more particularly to a machine wherein the ears are forced through a cutting head having cutting knives for cutting the kernels of corn, and means for centering and directing the ear to the cutting head.

An object of the invention is to provide a machine of the above type with an ear positioning and directing means which is capable of centering the ear in a predetermined fixed line regardless of the diameter of the ear.

A further object of the invention is to provide an ear receiving and centering means which operates automatically for positioning the ear with the axis thereof in a predetermined line and which clamps the ear so as to restrain the movement of the ear and hold the same in contact with the plunger which is forcing the ear from the ear receiving means.

A still further object of the invention is to provide a machine of the above type wherein the ear receiving means is automatically opened to receive the ear by devices operating independently of the plunger and the immediate actuating mechanism therefor.

A still further object of the invention is to provide a machine of the above type wherein the plunger is moved and given a relatively long throw by a rotating actuating device having a relatively short throw.

A still further object of the invention is to provide a plunger operating mechanism which includes devices for multiplying the movement imparted to the plunger from an actuated device therefor.

A still further object of the invention is to provide a machine of the above type which includes means for detachably supporting a plurality of cutting heads and a plurality of stripping heads, with which ear centering, directing and plunger feeding devices operate in succession.

A still further object of the invention is to provide a machine of the above type having a plurality of cutting heads and associated plunger feeding devices, with an operating mechanism which is located centrally between the heads and constructed so as to impart movements of like speed to the operating parts associated with each head.

A still further object of the invention is to provide a machine of the above type with an enclosing housing for the ear receiving and directing means, the plunger and the actuating mechanism therefor, which housing includes a removable cover plate having openings for directing the ear to the ear receiving and directing means.

A still further object of the invention is to provide a machine of the above type wherein the operating mechanism and housing therefor is mounted on a supporting base, so that said housing can be readily shifted about a vertical axis on said base for positioning the housing to give ready access to the operating mechanism therein.

In the drawings—

Figure 1 is a side view of the machine embodying the improvements;

Fig. 2 is a plan view of the same;

Fig. 3 is a plan view of the machine with the cover plate, cutting heads and stripping heads removed;

Fig. 4 is a view partly in end elevation and partly in vertical section adjacent the center of the machine;

Fig. 5 is a plan view of the plungers and the actuating mechanism therefor;

Fig. 6 is a transverse sectional view on the line 6—6 of Fig. 3;

Fig. 7 is a view showing the ear receiving and directing means and the actuating mechanism therefor;

Fig. 8 is a sectional view on the line 8—8 of Fig. 7;

Fig. 9 is a sectional view on the line 9—9 of Fig. 7, with the ear receiving devices thrown to full open position for receiving the ear therebetween;

Fig. 10 is an enlarged sectional view on the line 10—10 of Fig. 7, showing the ear receiving and directing means in full lines as engaging a relatively small ear, and in dotted lines as receiving a relatively large ear, both of which are positioned with the center thereof on the same predetermined line;

Fig. 11 is a bottom plan view of the lower cross head;

Fig. 12 is a side view of a sliding cam head carrying the cam for controlling the ear guiding and centering devices, and Fig. 13 is an end view of the same.

The invention is directed to a machine for cutting green corn. The machine includes a supporting base on which is mounted a housing containing all of the operating devices and the actuating mechanism therefor. This housing is attached to the base so that upon releasing the housing, it can be swung about a central vertical pivotal support for placing the housing so as to facilitate access to the operating parts contained therein. Mounted on this housing at each end thereof, is a cutter head including a series of spirally arranged cutting blades and depth gauges associated therewith. There is also a scraper head at each end of the machine positioned relative to the cutter head, so that a cob passes into the scraper head as it leaves the cutter head for stripping the kernels from the ear. Both the cutter head and the scraper head are of unit construction, and mounted in the housing so that they can be readily lifted therefrom without requiring the releasing of securing bolts.

Associated with each cutting head are ear positioning and guiding means. Each positioning and guiding means includes a pair of ear supporting devices and a pair of ear clamping devices. These devices are moved by spring means into contact with the ear and are separated from each other by positively operating mechanism so that the ear when laid on the clamping devices will be temporarily supported thereon, and as these devices separate, the ear will pass between the same on to the ear supporting devices. These ear supporting devices are shaped and moved so that the ear, regardless of its diameter, will always be positioned with the center line of the ear in a predetermined fixed line which is substantially the axial line of movement of the plunger which engages the ear and forces the same from the ear receiving and guiding means into and through the cutting head. The means which separates the ear receiving and guiding devices is in the form of a reciprocating cam operating upon rollers carried by arms which in turn, through connecting links, move the ear supporting and clamping devices. The operating cam is moved by an actuating lever which in turn is operated by a reciprocating cross head. This cross head is moved back and forth by a crank carrying a roller running in a transverse slot in the cross head. The cross head slides on guide rods at the sides of the machine. There is a second cross head mounted on independent guide rods which carries the plungers for engaging the ear for forcing the same from the ear receiving and guiding devices into and through the cutting head. This second cross head is operated from the first cross head by a train of devices which multiplies the movement so that while the first-named cross head has a relatively short back and forth movement, the upper cross head will have a relatively long back and forth movement, and can, therefore, move the plunger, not only through the ear receiving and guiding means, but also through the cutting head, and into and through the stripper head. This multiplying mechanism consists of a spindle carrying a gear which meshes with a stationary rack. This spindle is mounted on the lower cross head, and as the cross head moves back and forth, the gear will be rotated. Also on this spindle is a larger gear which meshes with a rack on the upper cross head. As this larger gear is rotated, it imparts an endwise movement to the upper cross head and of greater extent than the movement imparted to the lower cross head. All of these operating means are enclosed within a housing having a cover plate which is removable and which is provided with openings directly above the ear receiving and guiding means. The cover plate also is constructed so as to receive the ears and direct the ears toward these openings.

The invention will probably be better understood by a detail description of the illustrated embodiment thereof. The machine includes a supporting base 1. Mounted on this supporting base 1 is a housing 2 on which, and in which all of the operating parts of the machine are mounted. The housing is secured to the supporting base by a central pivot bolt 3. The base has a projecting flange 4, and the housing a similar projecting flange 5. These flanges are provided with radial grooves in which holding bolts 6 are placed for locking the housing in a set position on the supporting base. When these bolts are removed, then the housing can be turned about the pivot bolt 3 to a position transversely of the base or angularly to the base so as to facilitate access to the operating parts in the housing. The housing is elongated, and as shown, is constructed so as to support at the opposite ends thereof, cutting heads, one of which is indicated at 7 and the other at 8. This cutting head 7 is of unit construction, and includes cutting blades 9 and depth gauges 10. The cutting blades and depth gauges are carried by levers mounted on the supporting plate 11. The cutting head, as illustrated, is preferably of the construction shown in the application filed by Frank W. Douthitt, November 25, 1929, Serial No. 409,505. All of the parts of the cutter head are mounted on the supporting plate 11, and this supporting plate 11 is carried by the projecting brackets 12 bolted to the end of the housing 2 by suitable bolts 13. These brackets are provided with vertically extending grooves 14 which receive the supporting plate 11. The grooves are so shaped and the bracket is so formed, as to firmly hold this plate in a predetermined set position in the housing. It is understood, of course, that there is a bracket at each end of the housing, and the cutting heads are of similar construction. The brackets extend beyond the cutting heads, and on each pair of brackets is a scraper head. The one associated with the cutting head 7 is indicated at 15, and the one associated with the cutting head 8 is indicated at 16. The scraper head includes yielding devices which engage the cob as it is forced therethrough for scraping the kernels from the cob. Each scraper head includes a supporting plate 17 which is mounted in vertical grooves 18 in the brackets and supported by the brackets in very firm rigid set position and in proper alinement with the cutting head. The scraper head is held in place on the supporting brackets by a hand-operated set screw 19. The cutting heads are held in place on the brackets also by hand-operated set screws 20.

It is understood that these cutting heads can be quickly removed and other cutting heads substituted therefor; likewise, the scraping heads can be quickly removed and other scraping heads substituted therefor, or a cutting head may be substituted for a scraping head, so that the machine may be readily equipped for double cutting, or cutting and scraping. The machine can, therefore, be readily equipped for whole kernel cutting or for cream style cutting.

The housing 2 is provided with a removable cover plate 21. This cover plate has an opening 22 therethrough adjacent the cutting head 7, and an opening 23 therethrough adjacent the cutting head 8. The ears of corn are fed from a chute at 24 on to the cover plate. The housing has a recessed portion 25, and the operator stands in this recessed portion and can readily reach the ears indicated at E in Fig. 2 of the drawings, and place the ears, one at a time, in the openings in the cover plate. The ear, of course, will be positioned so that the point thereof projects toward the cutting head. The ear E' at the left, as shown in Fig. 2, is placed in the opening, and is supported by the ear receiving and positioning devices to be hereinafter described. The ear E² was positioned in the opening 23 on the ear receiving and guiding devices which have opened to receive the ear. Attention is called to the fact that these openings are very close together, and that the entire machine is relatively short, so that the operator, with no unusual body movements, can readily reach the ears and place them in first one opening and then the other, and thus continuously feed ears to the machine for cutting.

The ear receiving and guiding devices are shown in detail in Figures 6 to 10, inclusive. There are ear receiving and guiding devices associated with each opening and each cutting head. These ear receiving and guiding devices are similar in construction, and a detail description of one will answer for the other. The ear receiving and guiding devices at the left in Figures 2 and 3 are the ones which have been shown in detail. Each ear receiving and guiding mechanism includes a pair of ear supporting devices 26 and 26', and also a pair of ear clamping devices 27 and 27'. The ear supporting device 26 is provided with arms 28, 28, attached to sleeves 29, 29 which are clamped to a shaft 30 mounted in a bracket 31 at one end thereof and in a bracket 32 at the other end thereof. The clamping device 27 is carried by arms 33, 33 which are attached to collars 34, 34 which are freely mounted on the shaft 30. The shaft 30 is provided with a projecting arm 35. A link 36 is pivoted at 37 to this arm 35, and at its upper end is pivoted at 38 to an arm 39 attached to a shaft 40. This shaft 40 is journaled in upstanding portions carried by the bracket 32. When the shaft 40 is oscillated, it will impart oscillations to the ear supporting device 26. There is a second link 41 pivoted at 38 to the arm 39, and this link 41 is pivoted at 42 to an arm 43 which is formed integral with the collar 34 carrying the arm 33 supporting and forming the clamping member 27. When this shaft 40 is oscillated, it will impart oscillations both to the ear supporting device 26 and to the ear clamping device 27. The ear supporting device 26 is in the form of a solid wall or plate which extends from end to end thereof, and the inner face is curved as indicated at 44. The clamping member 27 also has a solid plate portion 27ª which extends from end to end thereof, and the inner face of this solid portion 27ª is curved and is concave relative to the center of the ear receiving and supporting devices. The face 44 is convex. The ear supporting and clamping device 27' is provided with a solid portion 27ª and with arms 33 carried by collars mounted on a shaft 30'. The ear supporting member 26' is mounted rigidly on this shaft 30' and is provided with a solid portion, the inner face of which is convex as indicated at 44'. A link 36' is pivoted at 37' to an arm 35', and at its upper end it is pivoted at 38' to an arm 39' which is carried by a shaft 40'. The shaft 40' is journaled in upstanding portions on the bracket 32 at the other side of the center line of the machine from the upstanding portion carrying the shaft 40. There is a link 41' pivoted at 38' to the arm 39' and also pivoted at 42' to an arm 43' which is formed integral with the arm carrying the ear clamping member 27'.

Encircling the shaft 40 is a coiled spring 45. This coiled spring is attached at one end to an upstanding portion 46 carried by the bracket 32 and supporting the inner end of the shaft 40. The spring at its other end bears on the arm 47 and tends to rotate the shaft 40, so as to move the clamping member 27 toward the clamping member 27'. The spring also yieldingly moves the ear supporting member 26 toward the ear supporting member 26'. The arm 47 carries a roller 48 which is adapted to be engaged by the cam face 49 of a sliding cam head 50. When this sliding cam head 50 is moved toward the left as viewed in Fig. 7, it will engage the roller 48 and bearing down on the arm 47 will move the ear clamping member 27 and the ear supporting member 26 away from their companion members.

The shaft 40' at the opposite side of the machine has a spring 45' surrounding the same, as shown in Fig. 3. It also carries an arm 47' provided with a roller 48' which is engaged by a cam face 49' of the sliding cam head 50. This spring operates to yieldingly move the clamping member 27' and the ear supporting member 26' toward its companion member, and the roller 48', when engaged by the cam on this movement of the cam support to the left, as viewed in Figures 3 and 7, will move the clamping member 27' and the ear supporting member 26' outward or away from its companion member.

The ear supporting members 27 and 27' are provided with laterally extending portions 27ᵇ. They are of similar construction, and the outer faces of these members are curved, respectively, about the supporting shafts 30 and 30' therefor. These outer faces are located directly beneath the opening 22 in the cover plate, and when an ear is placed in the opening, the ear supporting and clamping devices will receive the ear on this curved face 27ᵇ. The ear is placed on these faces when the clamping devices are positioned as shown in Figures 8 and 10. When the cam supporting member 50 moves to the left, it will move these clamping members 27 and 27' away from each other, and the ear will drop by gravity between said members on to the ear supporting devices 26 and 26'. In full lines in Fig. 10, the ear is shown at E''. The center of this ear is indicated at e. The center line of the ear e for the most efficient operation of the machine, should be exactly on the center line passing through the cutting head, and also the center line of the plunger which forces the ear through the cutting head. In broken lines in Fig. 10, at E''' is shown an ear of larger diameter. It is noted that the center of the ear of larger diameter is in exactly the same position as the center of the smaller ear E''. When the ear drops on to the supporting devices 26 and 26', the clamping devices 27 and 27' will be moved by the spring inwardly automatically until their movements are limited by contact of these devices with the ear. The same inward movement of the ear clamping devices results in an inward movement of the ear supporting devices 26 and 26'. The faces 44 and 44' are so curved that the ear is raised by the inward movement of these devices to bring the center of the ear on to this predetermined line passing centrally through the head, at the time when the ear is clamped by the inner curved faces of the clamping devices 27 and 27'. In other words, the movements imparted to these supporting devices and the clamping devices, together with the shaping of the inner faces thereof, results in a placing of the ear yieldingly clamped against the supporting devices and against the clamping devices, with the center of the ear in the same predetermined line, regardless of the size of the ear. It is also noted that the ear will be brought into the center line throughout the entire length of the ear. In other words, the longitudinal center line of the ear will be brought into substantially perfect alinement with the center line of the cutting head, and likewise the center line of the plunger which forces the ear from the ear centering and clamping devices into and through the cutting head. The ear supporting and clamping devices are yieldingly moved inward by springs which operate independently of each other, and therefore, they will firmly clamp and support the ear, and at the same time, permit the ear to centralize itself with the cutting head, so that the portion of the ear being operated upon by the cutting head will be centered in the cutting knives.

As noted above, the ear alining and supporting devices for the cutting head 8 are similar in construction to the ear supporting and guiding devices for the cutting head 7. So far as practical, similar reference letters have been applied. It is noted that the sliding cam head 50 has an inclined cam 49 at the right as well as at the left, and this cam engages the roller 48 carried by the arm 47 attached to the shaft 40 which controls the position of one of the ear supporting and the ear clamping device at the right of the machine. There is a similar cam 49' on this cam supporting member 50 which operates on the roller 48' carried by the shaft 40' which controls the other ear clamping and supporting member at the right of the machine as viewed in Fig. 3. When the cam supporting member 50 moves to the left as viewed in the drawings, it will positively open the clamping members associated with the cutting head 7, allowing the ear to drop in between the clamping member on to the supporting devices for the ear. When this cam supporting member 50 moves to the right, then these ear receiving and supporting members at the left are released, and the springs operate to force the clamping members into contact with the ear and position and center the same as above stated. At this time, the ear receiving and guiding devices at the right are positioned so as to allow the ear to pass between the clamping members, preparatory to the centering and clamping of the same when the cam supporting member 50 again moves to the left. In other words, by the reciprocations of this cam supporting member 50, first to the left and then to the right, the ear receiving and supporting devices are alternately operated to receive and center and clamp the ear preparatory to the feeding of the same into the cutting head.

The cam supporting member 50 is mounted for reciprocation on a supporting bracket 51, located centrally of the machine and between the openings 22 and 23 (see Fig. 3). The housing has inwardly projecting lugs 52 at each side thereof, and this bracket 51 is mounted thereon. As shown in Fig. 4, there is a shim 53 between the bracket and the supporting lug which may be removed and changed for shims of different thicknesses. The cam supporting member 50 is shown in detail in Figures 12 and 13. It is substantially U-shaped in cross section, and is provided with projecting ribs 54, 54 which engage trackways formed in the bracket. Thus it is that this cam supporting member 50 is mounted for free endwise sliding motion on this bracket 51. It is moved on the bracket by means of a lever 55 which is pivoted at 56 to the bracket 51. The lever has a slotted inner end 57 which engages a pin 58 on the cam supporting member 50. When the lever is oscillated, this cam supporting member will be moved therewith. The lever 55 is oscillated by means of an arm 59 which is mounted on a crosshead 60 by means of securing bolts 61, 61. This arm extends upwardly and through a slot in the inwardly projecting portion of the housing which carries the bracket 51. On the upper end of the arm 59 is a head 62 which is bolted thereto by suitable bolts 63. The head 62 carries a roller 64. The lever 55 at its outer end is enlarged and provided with a cam track 65. The roller 64 runs in this cam track. The cam track is shaped so as to provide a portion thereof which is substantially parallel with the movements of the crosshead 60 and the arm 59 carried thereby. The cam track at its outer ends has an inclined portion. When the head 62 moves to the left as viewed in Fig. 3, the roller will pass into the inclined portion at the left-hand side of the lever, and cause the lever to swing so that the cam supporting member 50 is moved to the right. Likewise, when the head 62 moves in the opposite direction, then the lever is swung in the opposite direction, and will cause the cam supporting member to move to the left. It will be noted from Fig. 3 of the drawings, that for quite a portion of the movement of the arm 59, no movement will be imparted to the lever. It is only when the head 62 approaches the extremes of its movement that the cam supporting member 50 is moved.

The crosshead 60 is mounted for sliding movement on rods 66, 66. These rods are located at opposite sides of the housing, and mounted in suitable bearings therefor. The crosshead slides freely on these supporting rods 66, 66.

Referring to Figures 4, 5 and 6, it will be noted that there is mounted in the housing a central vertical shaft 67. This central vertical shaft carries a worm wheel 68 which is engaged by a worm gear 69. The worm gear 69 is carried by a shaft 70 which is connected to the shaft of the operating motor indicated in broken lines at M in Fig. 4. At the other end of the shaft 70 is a hand wheel 71 which can be reached through the opening 72 in the wall of the housing, so that the parts may be turned by hand when desired. The vertical shaft 67 carries a crank arm 73 at its upper end, and on the crank arm is a roller 74. The lower crosshead 60 is shown in bottom plan view in Fig. 11. Said crosshead has a slot 75 therein which extends centrally across the crosshead and at right angles to the longitudinal axis of the housing. The crosshead has sleeves 60ᵃ, 60ᵃ which engage the rods 66, 66. The roller running in this slot 75 causes said crosshead to move back and forth as the shaft 67 rotates. It is noted that this shaft 67 is located centrally of the machine, longitudinally and laterally thereof. The crank working in this slot 75 imparts a movement of the same speed to the crosshead in one direction as in the other. The crosshead is traveling at its maximum speed when at the center position of the machine, and comes to a dwell and reverses its movement when it is at its extreme position at either side of the center of the machine. As the crosshead is reaching the end of its reciprocation, and slowing down in its movement for reversal, it oscillates the lever 55 which imparts opening movement to the ear receiving and guiding devices and which releases the same so that they may be closed by the springs.

The ear is forcibly moved from the ear receiving, supporting and alining devices by a plunger which is associated with each cutting head. These plungers are moved by the upper crosshead 76 provided with sleeves 77, 77 which engage and slide freely on rods 78, 78 mounted in suitable bearings in the main housing. A plunger 79 is threaded into a sleeve 80 attached to this upper crosshead 76 and is secured in a set adjusted position therein by means of a lock nut 81. This plunger 79 cooperates with the ear alining and receiving devices at the left, as viewed in Figures 1 and 2, and feeds the ear therefrom into the cutting head 7. A plunger 79' is associated with the cutting head 8 and is likewise threaded into a sleeve 80' and secured in set position therein by a lock nut 81'. These plungers are positioned so that the longitudinal axis of the plunger is in alinement with the center axis of the cutting head. It is also in the line in which the longitudinal center of the ear is placed by the ear alining and guiding devices. The plunger will, therefore, strike the butt of the ear centrally thereof, and pressing thereon, force it from the clamping devices which have a firm grip on the ear, and this insures that the ear will pass into the cutting head, properly centered, without buckling, and be forced through the cutting head. The strokes of the plungers are sufficient, so that the plunger passes not only into and through the cutting head with which it is associated, but also into and through the scraping head, or the second cutting head mounted at the ends of the brackets 12. In Fig. 2 of the drawings, it is noted the plunger 79 is shown as forcing the ear all the way through the scraping head 15 and the cob is dropping therefrom. The cob is indicated at $E^4$. The crosshead 76 is moved on the supporting rods therefor by a train of mechanism which is operated by the lower crosshead 60. The lower crosshead 60 is provided with a bracket 82. Journaled in this bracket 82 and in the crosshead in suitable ball bearings carried thereby, is a short shaft 83 carrying a gear 84 located between the bracket 82 and the crosshead and the gear 85 attached to the upper end thereof. The gear 84 meshes with a rack bar 86 which is stationary. This rack bar, as shown in Fig. 5, is bolted at 87 to a bracket arm 88, and is bolted at 89 to a bracket arm 90. The gear 85 meshes with a rack bar 91 which is bolted to the upper crosshead 76 by bolts 92, 92. The upper gear 85 is of larger diameter than the gear 84. Therefore, the reciprocations of the lower crosshead as transmitted to the upper crosshead will be multiplied. Both crossheads will travel in the same direction, but the crosshead 76 will move at a greater speed and to a greater extent. In other words, it has all of the movement of the crosshead 60, plus the additional movement caused by the rotating gears meshing, on the one hand with the stationary rack, and on the other hand, with the rack attached to the upper crosshead.

The throw of the crank arm 73 is relatively short, and therefore, the movement of the crosshead 60 is a comparatively short movement, but the movement of the crosshead 76 carrying the plungers is a relatively long movement, thus giving the necessary movements to the plungers so that they will quickly move through the ear supporting and centering devices, the cutting head and the scraping head, and be retracted therefrom.

Oil cups 93, 93 are carried by the upper crosshead and supply proper lubricating oil to the rods on which the upper crosshead 76 moves. The sleeves 77 are provided with oil ports 94, 94 which allow surplus oil to run therefrom into oil receiving recesses 95, 95 associated with the lower crosshead. There is also an oil port 96 for supplying oil to the bearings for the shaft 83.

On the supporting base are rollers 97, 97 over which a belt 98 runs. There are also rollers 99, 99 for the lower strand 98' of this belt. This belt may be used in connection with the machine for carrying away the cobs.

From the above description it will be apparent that a machine has been provided for cutting green corn from the cob which is very simple in construction. It is comparatively short and takes up little space, and yet provided with two cutting heads which operate in succession, and therefore, the cutting heads may be fed by a single operator placing the ears first for one head and then for the other. The operating mechanism is all contained within the housing and is centrally located between the heads. There are few parts which are readily accessible for repair and adjustments. The cutting heads may be removed as a unit, by simply releasing one of the clamping set screws, which is hand operated. The scraping heads may likewise be readily removed in a similar manner. When it is desired to remove the plungers, or any of the inner parts, the housing may be quickly released from the supporting base, and turned to a position at right angles to the supporting base, and away from other machines set end to end and closely spaced relative thereto. The cover plate may be quickly raised and access had to the parts within the machine. The ears are fed to a position close to where they are to be fed into the machine, so that one operator can readily reach the ears and supply the needs of the machine. The reciprocating cross heads are operated by a rotating crank which imparts movements of like speed to both the plungers and to the devices which open the clamping members to receive the ears. The operator places the ear on the clamping members, and when the clamping member is opened, the ear drops on to the ear supporting devices and the springs actuate these clamping members and supporting devices so that the ear will be raised to a position with the center line of the ear in alinement not only with the cutting head, but with the plunger which engages the ear and forces the same from the clamping members into and through the cutting head. The clamping member and the supporting device associated therewith are interconnected so that the clamping member positions the supporting device. Thus it is that the clamping members cooperate with the supporting devices for bringing about this centering of the ear just referred to. By centering the ear is meant the placing of the longitudinal axis of the ear substantially in alinement with the center of the head, and also the axial center of the plunger.

It is obvious that changes may be made in the construction shown and described, and in the arrangement of the parts, without departing from the spirit of the invention as set forth in the appended claims.

Having thus described the invention, what I claim as new and desire to secure by Letters Patent, is—

1. A machine for cutting corn comprising a cutting head, a plunger for forcing the ear through the head, means for receiving and guiding the ear including clamping members, an ear supporting device associated with each clamping member, a shaft on which the clamping member and associated supporting device are mounted, the supporting device being rigid with the shaft and the clamping member free thereon, said shaft having an arm projecting therefrom, and said clamping device having a projecting arm, an actuating shaft, an arm carried thereby, a link connecting said last-named arm to the arm connected with the ear supporting device, a link connecting the arm on said actuating shaft with the arm attached to the clamping member whereby said clamping member and supporting device are interconnected, a spring for moving the actuating shaft to cause the clamping member to engage the ear, a cam supporting member, and cams carried thereby and operating upon the shafts for actuating the respective clamping members and associated ear supporting devices.

2. A machine for cutting corn comprising a cutting head, ear receiving and guiding devices, a plunger for feeding the ears to the cutting head, a reciprocating actuating crosshead, an actuated crosshead carrying said plunger, means whereby the actuating crosshead imparts differential movements to the actuated crosshead, said ear receiving and guiding means including ear clamping members, yielding devices for moving said clamping members into engagement with the ear, a cam supporting member having cams adapted to separate the clamping members, and means operated by the actuating crosshead for moving said cam supporting member.

3. A machine for cutting corn comprising a cutting head, ear receiving and guiding devices, a plunger for feeding the ears to the cutting head, a reciprocating actuating crosshead, an actuated crosshead carrying said plunger, means whereby the actuating crosshead imparts movements to the actuated crosshead, said ear receiving and guiding means including ear clamping members, yielding devices for moving said clamping members into engagement with the ear, a cam supporting member having cams adapted to separate the clamping members, means operated by the actuating crosshead for moving said cam supporting member, said last-named means including a lever connected to said cam supporting member, an arm carried by the crosshead, and a roller carried by the arm and engaging the cam groove in said lever for swinging said lever in proper timing to separate the clamping members to receive the ear.

4. A machine for cutting corn comprising a cutting head, clamping members and associated ear supporting devices for centering the ear relative to the cutting head, a plunger for feeding the ear to the cutting head, an actuating crosshead, means intermediate the actuating crosshead and the plunger for moving the same, yielding means for moving the clamping members and ear positioning devices toward the center of the ear, control cams for moving said clamping members away from each other to receive the ear, and independent means operated by said crosshead for reciprocating said control cams.

5. A machine for cutting corn comprising a cutting head, clamping members and associated ear supporting devices for centering the ear relative to the cutting head, a plunger for feeding the ear to the cutting head, an actuating crosshead, means intermediate the actuating crosshead and the plunger for moving the same, yielding means for moving the clamping members and ear positioning devices toward the center of the ear, control cams for moving said clamping devices away from each other to receive the ear, independent means operated by said crosshead for reciprocating said control cams, said last-named means including a reciprocating member carrying the cams, a lever connected thereto and having a cam slot formed therein, and an arm rigid with the crosshead and carrying a roller operating in said cam groove, said cam groove being so shaped as to separate the clamping devices in proper timed relation to the movements of the plunger.

6. A machine for cutting corn comprising a supporting housing, unit cutting heads detachably mounted on said housing at opposite ends thereof, with the centers of the cutting heads in a line extending longitudinally of the housing, an ear centering and supporting device associated with each cutting head for placing the center of the ear in said line, a plunger associated with each cutting head and mounted for reciprocation in said line, means common to the plungers for alternately reciprocating the same and imparting like movements thereto, said last-named means including a vertical shaft located midway between the cutting heads, an actuating crosshead reciprocated thereby, an actuated crosshead on which said plungers are mounted for independent longitudinal adjustments, means whereby the movement of the actuating crosshead is multiplied and imparted to the actuated crosshead, yielding means for moving the clamping members toward each other, control cams for separating the clamping members, and means operated by the actuating crossheads for reciprocating said control cams.

7. A machine for cutting corn comprising a supporting housing, cutting heads mounted on the housing at opposite ends thereof, an ear centering and guiding device associated with each cutting head, a plunger associated with each cutting head, a reciprocating cross head on which the plungers are mounted, said ear centering and guiding device including movable clamping members, a shaft mounted in said housing, a crank carried by said shaft, a device reciprocated by said crank, means intermediate said device and the cross head for multiplying the movement of said device in said cross head, and means connected to said device and moving in unison therewith for operating the clamping members.

8. A machine for cutting corn comprising a supporting housing, cutting heads mounted on the housing at opposite ends thereof, an ear centering and guiding device associated with each cutting head, a plunger associated with each cutting head, a reciprocating cross head on which the plungers are mounted, said ear centering and guiding device including movable clamping members, a shaft mounted in said housing, a crank carried by said shaft, a device reciprocated by said crank, means intermediate said device and the cross head for multiplying the movement of said device in said cross head, a member moving in unison with said device, and a lever having a cam connection with said member for operating said clamping members.

9. A machine for cutting corn comprising a cutting head, a plunger for forcing the ear through the head, means for receiving and guiding the ear including clamping members, yielding means for moving the clamping members into engagement with the ear, a reciprocating member for separating the clamping members, an oscillating lever connected to said reciprocating member, a cross head, means for reciprocating said cross head, a member movable in unison with the cross head, said oscillating lever having a cam groove, and a roller carried by said reciprocating member operating in said cam groove for oscillating the lever.

10. A machine for cutting corn comprising a cutting head, a plunger for forcing the ear through the head, and means for receiving and guiding the ear including opposed ear clamping members mounted to move toward each other, a separate ear supporting member below each clamping member and mounted for movement toward the corresponding clamping member, an actuating device connected to each ear clamping member, and connections between the actuating device and the associated ear supporting member operating to equally space the clamping and supporting members when in clamping position from an axial line whereby ears of different sizes are supported and clamped with their centers in substantially the same axial line.

11. A machine for cutting corn comprising a cutting head, a plunger for forcing the ear through the head, and means for receiving and guiding the ear including opposed ear clamping members mounted to move toward each other, a separate ear supporting member below each clamping member and mounted for movement toward the corresponding clamping member, an actuating device connected to each ear clamping member, connections between the actuating device and the associated ear supporting member operating to equally space the clamping and supporting members when in clamping position from an axial line whereby ears of different sizes are supported and clamped with their centers in substantially the same axial line, yielding means connected to each actuating device for moving the clamping members toward each other, and means for engaging said actuating devices for positively separating said clamping members.

12. A machine for cutting corn comprising a cutting head, a plunger for forcing the ear through the head and means for receiving and guiding the ear including opposed ear clamping members mounted to move toward each other, a separate ear supporting member below each clamping member and mounted for movement toward the corresponding clamping member, an actuating device for each clamping member, a link connecting said actuating device to the clamping member for positively moving the same, and a link connecting said actuating device to the associated ear supporting member, said actuating device and links operating to equally space the clamping and supporting members when in clamping position from an axial line whereby ears of different sizes are supported and clamped with their centers in substantially the same axial line.

13. A machine for cutting corn comprising a cutting head, a plunger for forcing the ear through the head and means for receiving and guiding the ear including opposed ear clamping members mounted to move toward each other, a separate ear supporting member below each clamping member and mounted for movement toward the corresponding clamping member, an actuating device for each clamping member, a link connecting said actuating device to the clamping member for positively moving the same, a link connecting said actuating device to the associated ear supporting member, said actuating device and links operating to equally space the clamping and supporting members when in clamping position from an axial line whereby ears of different sizes are supported and clamped with their centers in substantially the same axial line, yielding means connected to each actuating device for moving the clamping members toward each other, and means for engaging said actuating devices for positively separating said clamping members.

14. A machine for cutting corn comprising a cutting head, a plunger for forcing the ear through the head, and means for receiving and guiding the ear including opposed ear clamping members mounted to move toward each other, a separate ear supporting member below each clamping member and mounted for movement toward the corresponding clamping member, a shaft having a crank associated with each clamping member, a link connecting said crank to the clamping member, a link connecting the crank to the ear supporting member, said crank and links operating to equally space the clamping and supporting members when in clamping position from an axial line whereby ears of different sizes are supported and clamped with their centers in substantially the same axial line.

15. A machine for cutting corn comprising a cutting head, a plunger for forcing the ear through the head, and means for receiving and guiding the ear including opposed ear clamping members mounted to move toward each other, a separate ear supporting member below each clamping member and mounted for movement toward the corresponding clamping member, a shaft having a crank associated with each clamping member, a link connecting said crank to the ear supporting member, said crank and links operating to equally space the clamping and supporting members when in clamping position from an axial line whereby ears of different sizes are supported and clamped with their centers in substantially the same axial line, yielding means connected to each shaft for moving the clamping members toward each other, and a cam operating to positively turn said shafts for separating the clamping members.

16. A machine for cutting corn comprising a cutter head, a plunger for forcing the ear through the head, and means for receiving and guiding the ear including opposed clamping members mounted to move toward each other, said clamping members having the inner faces thereof concave for contacting with the ear, and outwardly curved extensions at their upper ends for temporarily supporting the ear when the clamping members are closed, a separate ear supporting member below each clamping member and mounted for movement toward the corresponding clamping member, an actuating device connected to each ear clamping member, and connections between the actuating device and the associated ear supporting member operating to equally space the clamping and supporting members when in clamping position from an axial line whereby ears of different sizes are supported and clamped with their centers in substantially the same axial line.

17. A machine for cutting corn comprising a cutter head, a plunger for forcing the ear through the head, and means for receiving and guiding the ear including opposed clamping members mounted to move toward each other, said clamping members having the inner faces thereof concave for contacting with the ear, and outwardly curved extensions at their upper ends for temporarily supporting the ear when the clamping members are closed, a separate ear supporting member below each clamping member and mounted for movement toward the corresponding clamping member, an actuating device connected to each ear clamping member, connections between the actuating device and the associated ear supporting member operating to equally space the clamping and supporting members when in clamping position from an axial line whereby ears of different sizes are supported and clamped with their centers in substantially the same axial line, yielding means for moving the clamping devices into engagement with the ear, and positive means for separating said clamping devices.

FRANK W. DOUTHITT.